United States Patent Office 3,000,941
Patented Sept. 19, 1961

3,000,941
N-(NITROALKYL)-ALKENOYL AMIDES
Karl Klager, Sacramento, Calif., assignor to Aerojet-General Corporation, Azusa, Calif., a corporation of Ohio
No Drawing. Filed June 10, 1957, Ser. No. 665,624
12 Claims. (Cl. 260—561)

This invention relates to new compositions of matter and a method for their preparation. In particular, it relates to N-nitroalkyl substituted amides of alkenoic acids having the general formula:

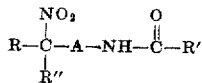

wherein R and R'' are the same or different and are hydrogen, alkyl or nitro radicals, R' is an alkenyl radical, and A is an alkylene radical.

The novel compositions of this invention are prepared by reacting a nitroalkyl isocyanate with an alkenoic acid in accordance with the general reaction scheme set forth below:

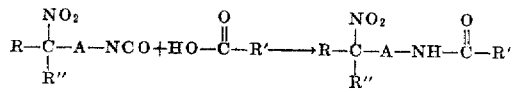

wherein A is an alkylene radical, R and R'' are the same or different and are hydrogen, alkyl or nitro radicals, and R' is an alkenyl radical.

The isocyanates used as starting materials in this invention are prepared by reacting a corresponding acid halide with sodium azide to form the azide and subsequently pyrolyzed to obtain the desired isocyanate, as described in my copending application Serial No. 405,515, filed January 21, 1954.

To more clearly illustrate my invention, the following examples are presented. It is to be understood, however, that these examples are presented merely as a means of illustration, and are not intended to limit the scope of the invention in any way.

EXAMPLE I

Preparation of N-3,3-dinitrobutyl acrylamide

A reaction flask provided with a stirrer, thermometer and reflux condenser was charged with 5.7 gm. 3,3-dinitrobutyl isocyanate, 6 ml. ethylene dichloride and 2.2 gm. acrylic acid. The mixture was refluxed for 2 hours, evaporated and taken up in chloroform. A part of the residue crystallized from chloroform. The other part, soluble in chloroform, was evaporated and the viscous oily residue was extracted with ether. The ether extract upon evaporation yielded a viscous oil, $n_D^{25} = 1.5005$ After prolonged standing, crystals were formed which exhibited a melting point of 38–39° C.

EXAMPLE II

Preparation of N-3,3-dinitrobutyl acrylamide

The mixture of 5.7 gm. 3,3-dinitrobutyl isocyanate and 6.6 gm. glacial acrylic acid was refluxed for 1 hour. Then the mixture was diluted with chloroform and washed with water and aqueous sodium bicarbonate. The chloroform solution was concentrated and decanted. The mother liquor was evaporated and a viscous oil, $n_D^{25} = 1.4966$, was obtained. This oil was recrystallized from ether to yield N-3,3-dinitrobutyl acrylamide, melting point 38–39° C.

By proceeding in accordance with the examples given above, a wide variety of nitroalkyl amides have been obtained. I have found that 3-nitropropyl isocyanate, 3,3,3-trinitropropyl isocyanate, as well as 3,3-dinitrobutyl isocyanate readily undergo condensation with acrylic, methacrylic, and crotonic acids to yield N-(3-nitropropyl) acrylamide, N-(3-nitropropyl) methacrylamide, N-(3-nitropropyl) crotonamide, N-(3,3,3-trinitropropyl) acrylamide, and N-(3,3,3-trinitropropyl) methacrylamide, N-(3,3,3-trinitropropyl) crotonamide, N-(3,3-dinitrobutyl) methacrylamide, and N-(3,3-dinitrobutyl) crotonamide.

From this it is apparent that the entire class of compounds within the contemplation of this disclosure readily lend themselves to amide formation.

The N-nitroalkylamides of my invention are valuable intermediates in the preparation of solid rocket propellants. The amides of my invention can be substituted in whole or in part for the polymerizable monomers used in the preparation of propellants according to the method described in assignee's copending U.S. patent application Ser. No. 392,472, filed November 16, 1953. The solid propellants thus obtained can be used as a primary propulsion source in rocket-propelled vehicles, and can also be used as a propellant for artillery missiles. When used as the primary propulsion source for rocket vehicles, they can be ignited conveniently by a conventional igniter, as for example the igniter disclosed in assignee's copending U.S. patent application Ser. No. 306,030, filed August 23, 1952. The propellant is preferably cast in tubular form and restricted in the conventional manner with a relatively inert resin, such as a polyester resin, and placed inside a chamber having one end open and leading into a conventional venturi rocket nozzle. Upon ignition, large quantities of gases are produced and exhausted through the nozzle creating propulsive force.

This application is a continuation-in-part of application Serial No. 452,731, filed August 27, 1954, now abandoned.

I claim:

1. As compositions of matter, the N-nitroalkyl amides of alkenoic acids having the formula:

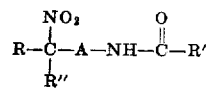

wherein A is a lower alkylene radical, R' is a lower alkenyl radical, and R and R'' are radicals selected from the group consisting of hydrogen, a lower alkyl and nitro radicals.

2. As compositions of matter, the N-nitroalkyl amides of alkenoic acids having the formula:

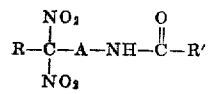

wherein A is a lower alkylene radical, R is a lower alkyl radical, and R' is a lower alkenyl radical.

3. As composition of matter, N-3',3'-dinitrobutyl acrylamide having the structural formula:

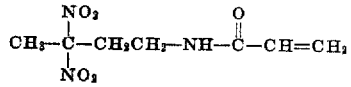

4. As a composition of matter, N-(3-nitropropyl) acrylamide having the structural formula:

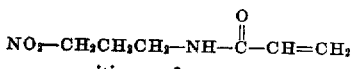

5. As a composition of matter, N-(3-nitropropyl) methacrylamide having the structural formula:

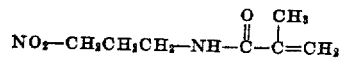

6. As a composition of matter, N-(3-nitropropyl) crotonamide having the structural formula:

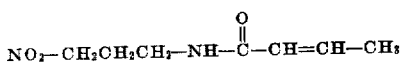

7. As a composition of matter, N-(3,3,3-trinitropropyl) acrylamide having the structural formula:

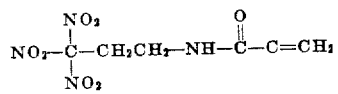

8. As a composition of matter, N-(3,3,3-trinitropropyl) methacrylamide having the structural formula:

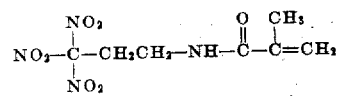

9. As a composition of matter, N-(3,3,3-trinitropropyl) crotonamide having the structural formula:

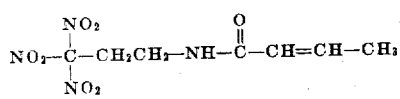

10. The method of preparing an N-nitroalkyl substituted amide of an alkenoic acid having the formula:

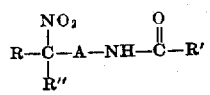

which comprises reacting a nitro-containing isocyanate having the formula:

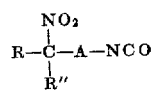

wherein A is a lower alkylene radical, R is a lower alkyl radical, R' is a lower alkenyl radical, and R" is a member of the group consisting of hydrogen and nitro radicals, with a lower alkenoic acid.

11. The method of preparing a N-nitroalkyl substituted amide of an alkenoic acid having the formula:

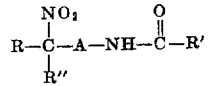

which comprises reacting an isocyanate having the general formula:

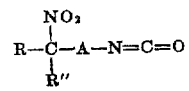

wherein A is a lower alkylene radical, R' is a lower alkenyl radical, and R and R" are radicals selected from the group consisting of hydrogen, a lower alkyl, and nitro radicals, with a lower alkenoic acid.

12. The method of preparing N-3,3-dinitrobutyl acrylamide which comprises reacting 3,3-dinitrobutyl isocyanate with acrylic acid.

No references cited.